E. J. FERGUSON AND W. C. ALEXANDER.
STEAM LUBRICATOR FILLING DEVICE.
APPLICATION FILED JAN. 18, 1918.
1,321,198.
Patented Nov. 11, 1919.
2 SHEETS—SHEET 1.
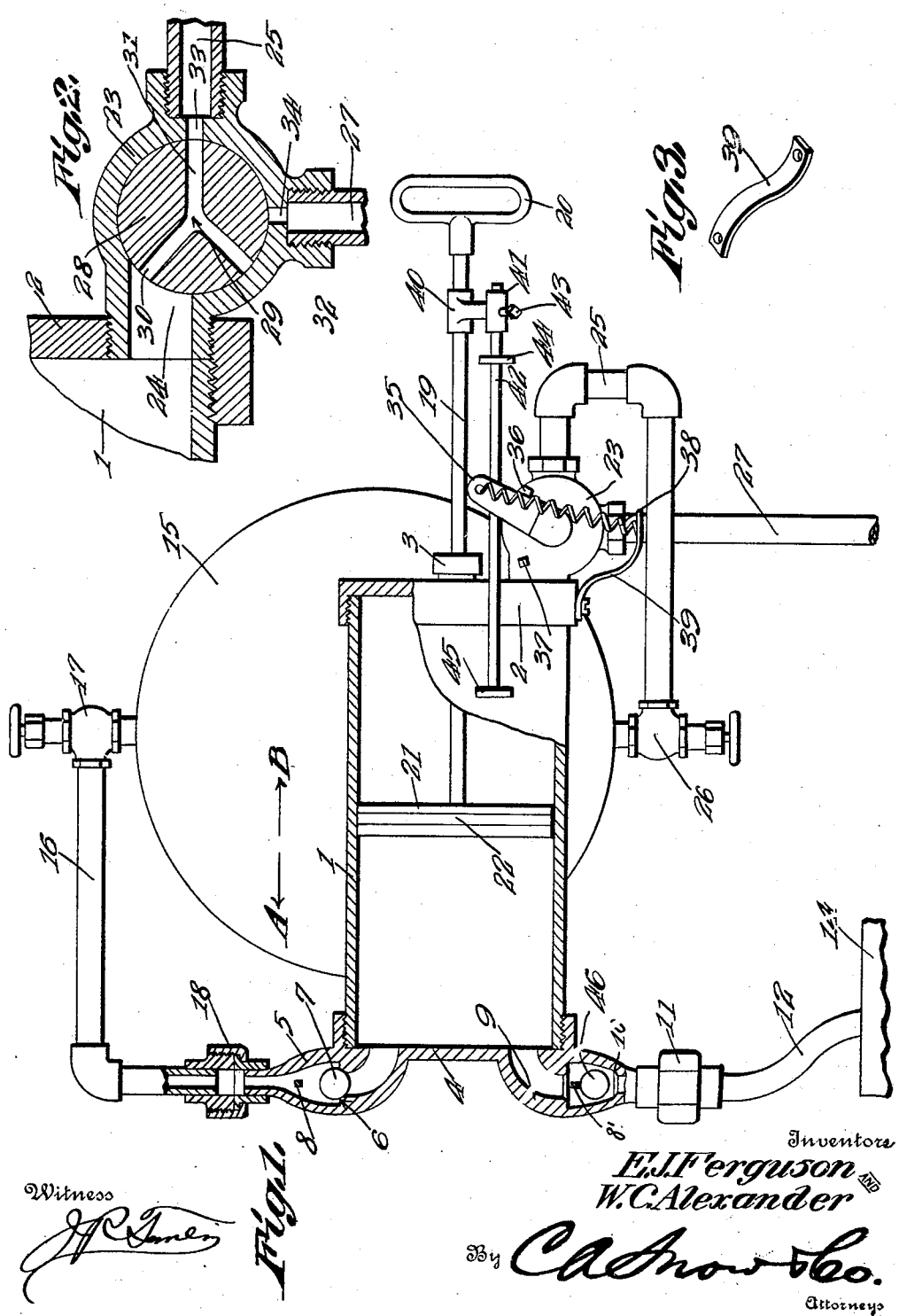

E. J. FERGUSON AND W. C. ALEXANDER.
STEAM LUBRICATOR FILLING DEVICE.
APPLICATION FILED JAN. 18, 1918.

1,321,198.

Patented Nov. 11, 1919.
2 SHEETS—SHEET 2.

Inventors
E.J.Ferguson
W.C.Alexander

Witness

UNITED STATES PATENT OFFICE.

ESTIS J. FERGUSON AND WILLIAM C. ALEXANDER, OF OSAWATOMIE, KANSAS.

STEAM-LUBRICATOR-FILLING DEVICE.

1,321,198.     Specification of Letters Patent.     Patented Nov. 11, 1919.

Application filed January 18, 1918. Serial No. 212,506.

*To all whom it may concern:*

Be it known that we, ESTIS J. FERGUSON and WILLIAM C. ALEXANDER, citizens of the United States, residing at Osawatomie, in the county of Miami, State of Kansas, have invented a new and useful Steam-Lubricator-Filling Device, of which the following is a specification.

It is the object of this invention to provide novel means whereby a lubricant may be supplied to a steam lubricator while the latter is under full pressure or otherwise.

It is within the province of the disclosure to improve generally and to enhance the utility of devices of that type to which the present invention appertains.

With the foregoing and other objects in view, the invention consists in the novel construction and arrangement of parts hereinafter described, illustrated in the accompanying drawings, and claimed, it being understood that, within the scope of what is claimed, changes falling within the skill of a mechanic may be made without departing from the spirit of the invention.

In the accompanying drawings:—

Figure 1 shows in side elevation, a device constructed in accordance with the present invention, parts being broken away, and parts appearing in section;

Fig. 2 is a section showing the three-way valve;

Fig. 3 is a detail view of the bracket 39.

Fig. 4 is a section showing a modified form of the invention;

Fig. 5 is a sectional detail illustrating the three-way valve, with a modified operating means.

Fig. 6 is a section taken approximately on the line 6—6 of Fig. 5.

In carrying out the invention as disclosed in Figs. 1 and 2, there is provided a cylinder 1 including a head 2 having a gland 3, and a head 4 carrying a nipple 5 provided with a seat 6 with which a valve 7 coöperates. The head 4 is supplied with a nipple 9 having a seat 10 with which a valve 46 coöperates, the movement of the valves being limited by such elements as the stops 8 and 8'. By means of a coupling 11, the nipple 9 is connected to a pipe or hose 12 adapted to dip into an oil receptacle 14. The numeral 15 designates a lubricator of the kind used in connection with engines which operate under high steam pressure.

There is pressure within the lubricator and water of condensation may collect therein. There are many lubricators to which the device forming the subject of this application may be applied, and since we do not claim to have invented a lubricator, the lubricator has been shown diagrammatically. From the lubricator, a pipe 16 extends, there being a hand valve 17 interposed in the pipe, and the pipe being connected by means of a coupling 18 with the nipple 5.

The invention comprises a piston, including a rod 19 mounted to reciprocate in the gland 3, a handle 20 on the outer end of the rod, and a head 21 on the inner end of the rod, the head being mounted to reciprocate in the cylinder 1, and being provided with a packing ring 22.

A valve casing 23 is attached to the head 2 and includes a port 24, a port 33, and a port 34, the ports being located approximately 120 degrees apart, the port 24 being of greater area than the ports 33 and 34. The port 24 communicates with the cylinder 1, through the head 2. A pipe 25 communicates with the port 33 and with the bottom of the lubricator 15. In the pipe 25, a hand valve 26 is interposed. A pipe 27 leads from the valve casing 23 and communicates with the port 34, the pipe being open to the atmosphere.

A valve 28 is journaled for rotation in the valve casing 23 and has a passage 29 comprising branches, 30, 31 and 32. The branch 32 is adapted to communicate with the port 34, the branch 31 is adapted to communicate with the port 33, and the branch 30 is adapted to communicate with the port 24. The branch 32 is adapted to move into and out of registration with the port 34, and the branch 31 is adapted to move into and out of communication with the port 33, but the port 24 is large enough so that the branch 30 is always in communication therewith. An arm 35 is connected to the valve 28 and is disposed exteriorly of the casing 23. The movements of the arm 35 are limited by stops 36 and 37 on the casing 23. The numeral 38 marks a retractile spring, one end of which is connected to the upper end of the arm 35, the other end of which is connected to a bracket 39 mounted on the cylinder head 2. When the arm 35 is swung to and fro, the spring 38, as it passes the center of rotation of the valve 28 tends to swing the arm 35 against the stop 36 or the stop 37.

A laterally projecting arm 40 is secured to the rod 19 and includes a socket 41 in which a rod 42 is mounted for longitudinal adjustment. The rod 42 is held in place by means of a set screw 43 threaded in to the socket 41. The rod 42 is supplied with shoulders 44 and 45, located on opposite sides of the arm 35 of the valve 28. Let it be supposed that the valves 26 and 17 are closed, and that the three-way valve 28 is in the position shown in the drawings. The head 21 is moved in the direction of the arrow A, and the air in front of the head passes the valve 7 and is compressed in the pipe 16. The shoulder 44 engages the arm 35, and, assisted by the spring 38, turns the valve 28 until the branch 32 registers with the port 34, the branch 30 remaining in registration with the port 24, and the branch 31 moving into a closed condition with respect to the port 33. Air can now enter behind the head 21, by way of the pipe 27, the port 34, the branch 32, the branch 30 and the port 24, thereby relieving the partial vacuum existing behind the head 21. The valves 26 and 17 are opened. The head 21 is moved in the direction of the arrow B and oil is drawn from the receptacle 14, through the pipe 12 and through nipple 9, past the valve 46, into the cylinder 1 in front of the head 21. The shoulder 45 tilts the arm 35 and disposes the valve 28 in the position of Fig. 2. Steam or water under pressure from the lubricator 15 passes by way of the pipe 25, the port 33, the branch 31, the branch 30 and the port 24, into the cylinder 1, behind the head 21. This operation creates enough pressure behind the head 21 so that the same may be advanced readily in the direction of the arrow A. When the head 21 is advanced in the direction of the arrow A, the oil in the cylinder 1 in front of the head is forced past the valve 7, through the nipple 5 and the pipe 16, into the lubricator 15. The shoulder 44 tilts the arm 35 and rotates the valve 28 until the branch 32 communicates with the port 34, whereupon the steam, water or the like, in the cylinder 1, behind the head 21, can flow away through the port 24, the branch 30, the branch 32, the port 34 and the pipe 27. The operation above described may be repeated to any desired extent, until the required amount of oil has been delivered into the lubricator 15. Each time that a charge of oil is delivered into the lubricator 15, a like amount of steam or water is taken out of the lubricator. It will be obvious that by removing the tube or hose 12 from the oil receptacle 14, the lubricator 15 may be pumped out or emptied by reciprocating the rod 19 and the head 21.

Figs. 5 and 6 disclose a modified means for operating the valve. Numeral 47 denotes a cylinder having a head 48 provided with an internal recess 49. A casing 50 is carried by the cylinder and has a port 51, corresponding to the port 24; a port 52 corresponding to the port 33; and a port 53 corresponding to the port 34. A valve 54 is mounted for rotation in the casing 50 and has a passage comprising a branch 55, corresponding to the branch 30; a branch 56, corresponding to the branch 32; and a branch 57, corresponding to the branch 31. A finger 58 projects from the valve 54 and operates in the port 51, the finger being adapted to be received in the recess 49. The valve 54 carries an arm 59, corresponding to the arm 35, the arm 59 being provided at its upper end with a fork 60 in which a rod 61 reciprocates, this element being represented on Fig. 1 by the rod 19. The rod 61 is provided with a shoulder 62, corresponding to the shoulder 44. The head which is carried by the rod 61 is shown at 63. In this form of the invention, the valve 54 is rotated in one direction by contact between the shoulder 44 and the fork 60, the valve being rotated in an opposite direction by contact between the head 63 and the finger 58.

In Fig. 4 of the drawings, a portable form of the invention has been shown, the same including a cylinder 64 having a head 65 provided with a gland 66, and having a head 67 to which a nozzle 68 is connected. A rod 69 slides in the gland 66 and is provided at its outer end with a handle 70, there being a head 71 on the inner end of the rod, the head being mounted to reciprocate in the cylinder 64. A pipe 72 projects from the head 65 and is united by means of a coupling 73 with a flexible metal tube 74 in which a valve 75 is interposed, the tube 74 terminating in a coupling 76.

In operation, the valve 75 is opened, and the piston head 71 is pushed to the forward end of the cylinder 64, the nozzle 68 being inserted in oil. Then the piston head 71 is drawn rearwardly, oil being sucked into the cylinder 64, through the nozzle 68. The valve 75 is closed. The nozzle 68 is connected to the top of the lubricator, while the coupling 76 is connected with the drain valve of the lubricator. The valve 75 is opened and the drain valve of the lubricator, allowing pressure to come in behind the piston head 71. The filler valve on the lubricator, adjacent the nozzle 68 is opened and since the pressure is equal on both sides of the head 71, the head may be pushed forwardly, water being drawn out of the lubricator, through the pipe 74, as oil is forced into the lubricator, through the nozzle 68. When the head 71 has reached the forward end of its stroke, the valve 75 is closed, as well as the drain valve on the lubricator. The filler valve on the lubricator is closed, the structure shown in Fig. 4 is detached from the lubricator, and the water which has been removed from the lubricator into the cylinder 64 behind the head 71 is allowed to run off by opening the valve 75 and drawing the head 71 rearwardly.

For convenience in claiming the invention, the rod 19 and the head 21 of Fig. 1, and the rod 61 and the head 63 of the Fig. 5 may be alluded to generally as a piston working in the cylinder, the form shown in Fig. 5 including an operative connection between the piston and the valve 54, which connection is represented by the arm 59, the shoulder 44, and the finger 58, the operative connection in Fig. 1 being represented by the rod 19, the rod 42, the shoulders 44 and 45 and the arm 35 on the valve.

Having thus described the invention, what is claimed is:—

1. A device for injecting oil into a lubricator and for withdrawing fluid therefrom, comprising a cylinder; a piston working in the cylinder; valve controlled oil inlet and discharge means communicating with the cylinder upon one side of the piston; a conduit adapted for connection with a lubricator; a combined inlet and discharge conduit; a valve coöperating with the conduits to place them one at a time in communication with the cylinder upon the other side of the piston; and an operative connection between the piston and the valve.

2. A device for injecting oil into a lubricator and for withdrawing fluid therefrom, comprising a cylinder provided at one end with a valve-controlled oil inlet and discharge means; a pair of drain conduits, one of which is adapted for connection with a lubricator, the other of which is in communication with the atmosphere; a three-way valve controlling communication between the conduits and the other end of the cylinder; a piston working in the cylinder; and an operative connection between the piston and the valve; and means for connecting the second port with a lubricator.

3. A device for injecting oil into a lubricator and for withdrawing fluid therefrom, comprising a cylinder provided at one end with valve-controlled oil inlet and discharge means; a casing provided with a first port communicating with the cylinder, a second port and a combined discharge and air inlet port; a valve journaled in the casing and provided with a passage including a first branch in continuous communication with the first port, a second branch movable into and out of registration with the second port, and a third branch movable into and out of registration with the discharge and inlet port; a piston working in the cylinder; an operative connection between the piston and the valve.

In testimony that we claim the foregoing as our own, we have hereto affixed our signatures in the presence of two witnesses.

ESTIS J. FERGUSON.
WILLIAM C. ALEXANDER.

Witnesses:
ROBERT R. PARKER,
P. W. ROBINSON.

Copies of this patent may be obtained for five cents each, by addressing the "Commissioner of Patents, Washington, D. C."